(12) United States Patent
Bruce et al.

(10) Patent No.: US 11,593,411 B2
(45) Date of Patent: Feb. 28, 2023

(54) HISTORICAL AUGMENTATION OF ELECTRONIC MAPS

(71) Applicant: International Business Machines Corporation, Armonk, NY (US)

(72) Inventors: Edwin J. Bruce, Corinth, TX (US); Marlentae Johnson, Fort Lawn, SC (US); Huida Liu, Irving, TX (US); Chaithra Mysore Nagaraj, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 16/569,868

(22) Filed: Sep. 13, 2019

(65) Prior Publication Data

US 2021/0081440 A1 Mar. 18, 2021

(51) Int. Cl.
*G06F 16/9538* (2019.01)
*G06F 16/29* (2019.01)
*H04W 4/029* (2018.01)
*G06F 16/9537* (2019.01)
(Continued)

(52) U.S. Cl.
CPC .......... *G06F 16/29* (2019.01); *G06F 16/9537* (2019.01); *G06F 16/9538* (2019.01); *G06F 40/169* (2020.01); *H04L 67/52* (2022.05); *H04W 4/029* (2018.02)

(58) Field of Classification Search
CPC .. G06F 16/29; G06F 16/9538; G06F 16/9537; H04W 4/029; H04L 67/52
See application file for complete search history.

(56) References Cited

U.S. PATENT DOCUMENTS 9,792,368 B1 * 10/2017 Amacker ............ G01C 21/3602
11,004,110 B2 * 5/2021 Mouline ................ G06Q 50/01
2009/0063424 A1 3/2009 Iwamura et al.
(Continued)

FOREIGN PATENT DOCUMENTS

CN 104077394 A 10/2014

OTHER PUBLICATIONS

Powell, "Historical Map Overlays for Google Maps and Google Earth", Where To Find and View Georeferenced Historical Maps, ThoughtCo. Jan. 11, 2019, 10 pages. https://www.thoughtco.com/historical-map-overlays-for-google-1422162.
(Continued)

*Primary Examiner* — Andrea C Leggett
(74) *Attorney, Agent, or Firm* — Daniel M. Yeates (57) ABSTRACT

Disclosed is a computer implemented method to annotate electronic maps with historical data, the method comprising: receiving a first query from a user, wherein the first query includes a request for historical data of a mapped area. The method also comprises retrieving a plurality of references, wherein each reference includes a location reference, and each reference is related to the mapped area. The method further comprises normalizing each location reference to a common coordinate system. The method also comprises ranking each of the plurality of references. The method further comprises generating a first result, wherein the first result is responsive to the first query, and the first result is based on the ranking. The method further comprises determining a confidence score for the first result, and returning the first result to the user.

20 Claims, 6 Drawing Sheets

(51) Int. Cl.
*G06F 40/169* (2020.01)
*H04L 67/52* (2022.01)

(56) References Cited

U.S. PATENT DOCUMENTS

| | | |
|---|---|---|
| 2011/0007094 A1 | 1/2011 | Nash et al. |
| 2013/0067379 A1 | 3/2013 | Chutkay et al. |
| 2013/0083011 A1 | 4/2013 | Geisner et al. |
| 2013/0132846 A1 | 5/2013 | Martin et al. |
| 2014/0082062 A1 | 3/2014 | Bellver et al. |
| 2014/0214317 A1* | 7/2014 | Sanjay .............. G01S 19/05 701/469 |
| 2017/0236224 A1* | 8/2017 | Florance ............ G06Q 50/16 705/313 |
| 2018/0143998 A1* | 5/2018 | Prahladka ............ G06F 16/29 |
| 2019/0228262 A1* | 7/2019 | Gonzalez ........... A63F 13/2145 |
| 2019/0230181 A1* | 7/2019 | Wang ................ H04L 67/567 |

OTHER PUBLICATIONS

Smith, "Travel back in time with Google Street View", Sep. 7, 2018, [Accessed May 8, 2019], 6 pages. http://home.bt.com/tech-gadgets/internet/travel-back-in-time-with-google-street-view-11363960715817.

"About OldNYC", OldNYC, Website, Accessed May 8, 2019, 3 pages. https://www.oldnyc.org/about.html.

Martins et al., "Geographically-Aware Information Retrieval for Collections of Digitized Historical Maps", In Proceedings of the 4th ACM workshop on Geographical information retrieval (GIR '07). ACM, 2007, 4 pages.

Torres et al., "Picture the Past From the Present", In Proceedings of the Third International Conference on Internet Multimedia Computing and Service (ICIMCS '11). ACM, 2011, 4 pages.

Mell et al., "The NIST Definition of Cloud Computing", Recommendations of the National Institute of Standards and Technology, Sep. 2011, U.S. Department of Commerce, 7 pages.

* cited by examiner

HISTORICAL AUGMENTATION OF ELECTRONIC MAPS

BACKGROUND

The present disclosure relates to mapping systems, and, more specifically, to enhancing mapping systems with relevant historical data.

Modern geographic mapping services offer a wide variety of information about point locations, territories, and regions whether or not they are legally incorporated. Generally available annotations renderable in mapped areas include street plans, terrain, zoomable satellite views, vehicular traffic, and ground level perspectives.

SUMMARY

Disclosed is a computer implemented method to annotate electronic maps with historical data, the method comprising: receiving a first query from a user, wherein the first query includes a request for historical data of a mapped area. The method also comprises retrieving, in response to the first query, a plurality of references from a plurality of data repositories, wherein each reference includes a location reference, and each reference is related to the mapped area. The method further comprises normalizing each location reference from each of the plurality of references to a common coordinate system. The method also comprises ranking each of the plurality of references. The method further comprises generating a first result, wherein the first result is responsive to the first query, and the first result is based on the ranking. The method further comprises determining a confidence score for the first result, and returning the first result to the user. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to mapping systems, and, more specifically, to enhancing mapping systems with historical relevant data. Aspects of the present disclosure may be better appreciated in light of the aforementioned applications.

Modern geographic mapping services offer a wide variety of information about point locations, territories, and regions, whether or not they are legally incorporated. Generally available annotations renderable in mapped areas include street plans, terrain, zoomable satellite views, vehicular traffic, and ground level perspectives.

However, modern mapping systems generally provide information about what is current, and the history of the area is generally overwritten and/or stored in archives. However, by utilizing old/archived data and other available information, one may be able to gain a greater understanding of the historical uses of a building, park, city, and/or other mapped location.

Embodiments of the present invention include a mapping system configured to provide historical information about mapped locations. In some embodiments, the mapping system uses available historical data to determine historical information about a mapped location. Historical data may be any data that may assist in determining a historical result about a mapped location. In some embodiments, historical data includes data superseded by new data. In some embodiments, historical data is any data that was generated before a predetermined period (e.g., 1 year, 10 years, etc.). In some embodiments, historical data can be based on the type or source of the data. For example, any news story (e.g., newspaper, magazine, etc.) may be historical data upon publication, a business license may become historical data when it expires, and a land deed may become historical data when the land is assigned to a new owner. In some embodiments, historical data includes any data not used to generate a map (e.g., deeds, newspapers, business licenses, etc.). Consider an example where an old school had to be rebuilt. The historical mapping system can gather data from news stories, permits, building plans, and other data to determine how the old school sits in relation to the new school. It could produce an outline of the old school building, superimposed over a current image of the school grounds. As another example, a user may also be able to see the layout of a childhood neighborhood that has been redeveloped.

In some cases, there is a lag time in mapping systems obtaining and implementing updates to the mapped areas (e.g., a new neighborhood being built, an old road being bulldozed, or a restaurant changes their name). This may cause a mapping system to provide inaccurate information, leading to confusion for the user. For example, assume a restaurant that occupies a certain building goes out of business, and a few months later, a different restaurant opens in the same building. Until the data is updated, a search for the first restaurant will provide the location of the now closed restaurant as if it is still in business. Thus, embodiments of the present disclosure analyze records to provide the most accurate and up to date data available. In another example, in a situation where a new housing development has been built but a satellite image of the area has not been updated, the historical mapping system can use plat maps, building permits, land titles, etc. to determine the location of roads, structures (both completed and/or in progress) and parks, and relay the accurate information to a user.

In many situations, the amount of historical data that can be accessed and analyzed is limited and piecemeal. Embodiments of the present invention can analyze various bits of information from various sources and piece together relevant data. In some embodiments, the historical mapping system can provide a confidence related to the accuracy of the information. For example, it is possible that two news stories contain different data about the look of an original structure. Various components of the mapping system can analyze the various sources and provide to the user one of the looks with a confidence of being correct. Various setpoints can be established at which to withhold or provide information based on the confidence score. For example, the mapping system may withhold historical data if there is a confidence score below a predetermined threshold (e.g., 50%). Alternatively, it may only present the historical data if the confidence score is above a predetermined threshold.

Various embodiments of the present invention can rank the reliability of sources in configuring the confidence score. For example, if there are two sources of data, where one is a court record and the second a magazine article, the system could rank the court record's data as higher than that of the article, and calculate the confidence score accordingly.

In some embodiments, the mapping system normalizes all location data to a common system. In some embodiments, all location data is converted into coordinates corresponding to the Earth-Centered Earth-Fixed (ECEF, or ECF) coordinate system. The ECF is the standard longitude and latitude in degrees, minutes, seconds, etc. In some embodiments, location data can be reduced to any system that allows for determining the relative location of objects with respect to each other. Once normalized, locations from various sources can be compared against one another. The mapping system may use references from multiple sources to normalize the data. For example, assume a user is trying to find the location of an old factory. The system can find one reference that identifies the location of the new factory, and a second reference that states the new factory is one mile up the river from the old factory. The one mile can be converted into the coordinate system and an approximate location of the old factory identified.

In some embodiments, the mapping system presents the historical data to a user. In some embodiments, the historical data provided to the user is a map with relevant historical annotations. The annotations may include a confidence level of the information being correct.

In some embodiments, the historical mapping system includes one or more learning models. The learning models may provide efficient methods on identifying relevant sources, ranking sources against each other, generating confidences, piecing together two or more fragments of data to determine historical data, normalizing coordinates, and/or other similar processes. In some embodiments, the results of each query are stored, and feedback from users is obtained. This data can be used to update the learning models and used in future analysis. In some embodiments, training data is used to train the learning models.

The aforementioned advantages are example advantages, and embodiments exist that can include all, some, or none of the aforementioned advantages while remaining within the spirit and scope of the present disclosure.

Figure 1:
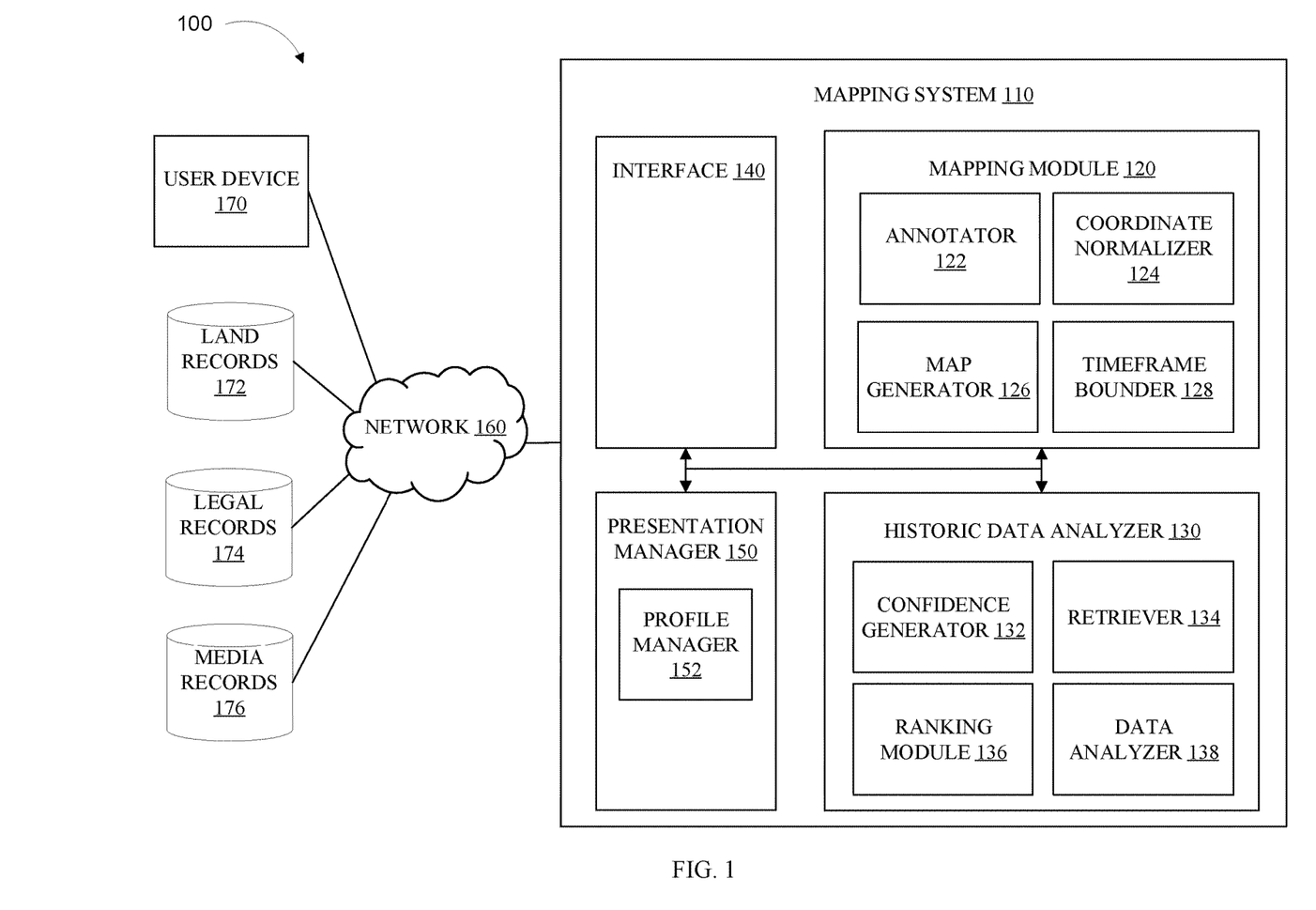
FIG. 1 illustrates a functional diagram of a computing environment, generally designated 100, suitable for operation of a mapping system, in accordance with embodiments of the present disclosure.

Referring now to various embodiments of the present invention in more detail, FIG. 1 is a representation of a computing environment 100, that is capable of running a mapping system 110 (or historical mapping system) in accordance with one or more embodiments of the present invention. The components of computing environment 100 and/or mapping system 110 can include more or fewer modules than those depicted. Mapping system 110 can include modules and sub-modules in different locations than depicted. Additionally, any module may be a sub-module or a parent module to each of the other modules within mapping system 110. Many modifications to the depicted environment may be made by those skilled in the art without departing from the scope of the disclosure as recited by the claims.

Computing environment 100 includes mapping system 110, network 160, user device 170, land records 172, legal records 174, and media records 176. Network 160 can be, for example, a telecommunications network, a local area network (LAN), a wide area network (WAN) such as the Internet, or a combination of the three, and can include wired, wireless, or fiber optic connections. Network 160 may include one or more wired and/or wireless networks that are capable of receiving and transmitting data, voice, and/or video signals, including multimedia signals that include voice, data, and video information. In general, network 160 may be any combination of connections and protocols that will support communications between mapping system 110, user device 170, land records 172, legal records 174, media records 176, and other computing devices (not shown) within computing environment 100.

Mapping system 110 can be a standalone computing device, a management server, a web server, a mobile computing device, or any other electronic device or computing system capable of receiving, sending, and processing data. In other embodiments, mapping system 110 can represent a server computing system utilizing multiple computers as a server system, such as in a cloud computing environment. In some embodiments, mapping system 110 represents a computing system utilizing clustered computers and components (e.g., database server computers, application server computers, etc.) that act as a single pool of seamless resources when accessed within computing environment 100. In some embodiments, mapping system 110 includes mapping module 120, historical data analyzer 130, interface 140, and presentation manager 150.

In various embodiments, mapping system 110 gathers and analyzes historical data regarding a mapped location. The historical data can be gathered in response to a query request directed to the mapping system. In some embodiments, the query includes a request for historical data. This request can be part of all queries sent to mapping system 110. Alternatively, the request may be the result of an action by a user. For example, the user may select a checkbox that indicates the query results will include historical information. Or, the query may include user input that indicates a request for historical data (e.g., the query can be "what was located at this address in 1996?"). The indication may be received in the same form (e.g., voice, text input, etc.) as the rest of the query.

In some embodiments, mapping system 110 includes one or more learning models. In some embodiments, mapping system 110 records the results of each analysis. These results may be used in future results to assist in identifying and displaying historical data. Additionally, these results may be used to update the learning models.

Mapping module 120 can be any combination of hardware and/or software configured to generate maps containing historical data. In some embodiments, mapping module 120 includes annotator 122, coordinate normalizer 124, map generator 126 and timeframe bounder 128.

Map generator 126 can be any combination of hardware and/or software configured to generate maps. The maps may be displayed on a viewing device integrated with mapping system 110 and/or on a remote device (e.g., user device 170). Map generator 126 may obtain data from a storage location and render the data into a viewable map. The map may be in a variety of formats (e.g., satellite view, etc.). In some embodiments, map generator 126 operates as a presently available mapping system (e.g., MapQuest®, Google Maps®, etc.).

Coordinate normalizer 124 can be any combination of hardware and/or software configured to convert all location data to a common coordinate system. In some embodiments, the location data is converted to degrees using the ECEF standard.

Annotator 122 can be any combination of hardware and/or software configured to add details to a map. In some embodiments, the details are added to the map generated by map generator 126. The details may include buildings, street names, directions, park names, contact information, links to different websites, and/or any other data that may be requested by or useful to the user. In some embodiments, annotator 122 uses the normalized coordinates to accurately annotate the map.

Timeframe bounder 128 can be any combination of hardware and/or software configured to limit the time to provide results to the user. In some embodiments, timeframe bounder 128 limits the amount of time spent generating a map. The time limit may be based on actual time, on computing resources, user input, and/or other similar factors. It will take time to search for, retrieve, and analyze historical data. Because, in some cases, the data is imperfect, mapping system 110 can theoretically look for and analyze data indefinitely without generating a conclusive result. In some embodiments, the time limit is dynamic. The dynamic time limit can be based on the number and quality of results found, the amount of data available, and/or other similar factors. For example, if a query relates to the history of a particular house, and the system cannot find any public data related to that house, the time limit may be very short. Alternatively, if that house has several results from several sources, the time limit will be relatively long, to give time to analyze all the data.

Historical data analyzer 130 can be any combination of hardware and/or software configured to determine historical data about a mapped location. In some embodiments, historical data analyzer 130 gathers and analyzes one or more sources related to a mapped location. In some embodiments, historical analyzer 130 uses fragments of data from various sources to make determinations about mapped locations. In some embodiments, historical analyzer 130 determines if there are adequate sources to make associations that lead to reasonable conclusions about the mapped location.

In some embodiments, historical data analyzer 130 includes confidence generator 132, retriever 134, ranker 136, and data analyzer 138. In some embodiments, historical data analyzer 130 includes one or more neural networks. The neural network may learn from past results and produce better or more accurate results on future queries. In some embodiments, confidence generator 132, retrieval module 134, ranking module 136, and data analyzer 138 may each include a unique neural network, and/or share a neural network. Neural networks are discussed in further detail below in relation to FIG. 4.

Retrieval module 134 can be any combination of hardware and/or software configured to retrieve historical references. Historical references can be publicly or privately available sources that include information about the location. This includes newspapers, magazines, television broadcasts, books, articles, photographs, deeds, land records, court records, and any other similar data. In some embodiments, historical data is stored in data repositories.

In some embodiments, the references are retrieved in response to the user requesting historical data. In some embodiments, retrieval module 134 forms and/or forwards the query to relevant databases. For example, if there is a query about the history of a school, retrieval module 134 can query media sources, land records, and court records for any data about that school. Each query sent to each source of data (database) may be configured to the correct form prior to the sending/forwarding of the query to the source of data. In some embodiments, a query is sent to all sources of data, while in other embodiments, the query is sent to a subset of the available data repositories.

In some embodiments, retrieval module 134 uses one or more neural networks. The neural networks may indicate which repositories are likely to contain relevant data, and the order in which to search the repositories.

Data analyzer 138 can be any combination of hardware and/or software configured to analyze the retrieved historical data. In some embodiments, data analyzer 138 uses natural language processing (NLP) to analyze sources. A natural language processor is a system configured to analyze human speech or written text. NLP can divide each phrase into its parts and determine an intended meaning of the phrase. In some embodiments, data analyzer 138 includes an image processor. The image processor is configured to gather relevant data from an image.

In some embodiments, data analyzer 138 translates reference data into coordinates. The coordinate system used may be the same system used by coordinate normalizer 124. For example, if a query is looking for the location of an "old factory" and a reference says, "the new factory was built half a mile due west of the old factory", data analyzer 138 can calculate the coordinates of the old factory based on that description. Once all data is converted and normalized, data points can be compared against each other to formulate conclusions.

In some embodiments, data analyzer 138 uses one or more neural networks. The neural networks may assist in piecing together information fragments to develop a result about a mapped location. Additionally, the neural networks may assist in normalizing coordinates from vague references (e.g., A is a 15-minute walk from B).

Ranking module 136 can be any combination of hardware and/or software configured to rank sources of data. In some embodiments, the sources are ranked in response to retrieving and/or analyzing the data. In some embodiments, the data is ranked relative to other data obtained for a specific query. In some embodiments, the data is ranked based on the source. Sources of data that are generally considered more reliable and accurate may always be ranked higher than other sources. For example, sources from a court order will be ranked higher than those from a news article, which will rank higher than any from a comment on a message board. In some embodiments, descriptions that contain definite language may be ranked higher than descriptions that use vague language. For example, if a first reference says, "the new factory was built half a mile due west of the old factory", and a second reference says, "the new factory is further out of town than the old factory", then the first reference would be ranked higher than the second reference.

In some embodiments, ranking module 136 uses one or more neural networks. The neural networks may provide information about which sources are more likely to be accurate, and/or provide the relative weighting values of each source against the other sources (e.g., reference A is twice as likely to be accurate than reference B).

Confidence generator 132 can be any combination of hardware and/or software configured to generate a confidence score for the historical analysis. The confidence score may represent the likelihood the analysis is providing accurate information. In some embodiments, the confidence score is based on the number of references, the relative ranking of the references, any conflicting references, and/or other similar factors. For example, if a query asked what business occupied a specific location in 1995, and the analysis found a business license naming business A, a news story about business A at that location, and a deed conveying the building to business A, there would be a high confidence in returning the result of business A. Alternatively, if retrieval module 134 returned a business license with business A, a news story about business B at that location and time, and a deed conveying the building to business C in 1994, then a relatively low confidence could be returned.

In some embodiments, confidence generator 132 uses one or more neural networks. The neural network may provide data to indicate how accurate a final determination is about a mapped location.

Interface 140 can be any combination of hardware and/or software configured to communicate mapping data. In some embodiments, communicating mapping data includes receiving of queries and other inputs (e.g., profile data, setting preferences, feedback, etc.) and sending (output) mapping data to the requestor. The incoming and outgoing data may be sent to or received from remote devices (e.g., user device 170) and/or other components and modules of mapping system 110 (e.g., monitor, etc.).

Presentation manager 150 can be any combination of hardware and/or software configured to display the map in accordance with user settings and system requirements. Presentation manager 150 interacts with interface 140 to configure the data before it is sent to the user.

In some embodiments, presentation manager 150 determines how to present the historical information to the user. The method of presentation may be selected from a set of predetermined options. The options may include outlines, text boxes, overlays, and other similar presentation methods. In some embodiments, multiple methods may be used for a single query.

In some embodiments, the method of presentation is selected based on the form of the query. For example, if a query asks, "where was my childhood elementary school?", mapping system 110 may return a current map with a box outlining the location of the old school. For another example, if the query asks, "what business was located in this building in 1995?", mapping system 110 may return a text box that shows a list of the businesses that occupied the building by year.

Profile manager 152 can be any combination of hardware and/or software configured to manage a user's preferences. In some embodiments, profile manager 152 allows a user to create and manage an account. The user may adjust settings.

The settings may be related to the time to spend looking for historical information, the confidence of results, the method of displaying the results, and other similar factors. For example, one setting may be related to confidence score. A user may decide to have the system display historical information if it is above a predefined confidence threshold. Alternatively, the user may decide to have the system always show historical information unless it falls below a predefined confidence threshold. Also, the user may decide to always show the historical information with the confidence score.

User device 170 can be any of a number of different data processing systems including client computing devices, server computing devices, a tablet computer, laptop computer, telephone or other communication device, a personal digital assistant (PDA), or the like. In some illustrative examples, the user device 170 may be a portable computing device that is configured with flash memory to provide non-volatile memory for storing operating system files and/ or user-generated data, for example. Thus, the user device 170 may essentially be any known or later-developed data processing system without architectural limitation.

Land records 172, legal records 174, and media records 176 can be any repositories that store historical data. They can be databases, computer systems, and/or any other system designed to store and allow retrieval of data. In some embodiments, land records 172, legal records 174, and media records 176 are combined into a single system. In some embodiments, land records 172, legal records 174, and media records 176 are divided into multiple additional systems in various locations. Any written document, voice recording, video recording, photograph, and/or other form of media may be considered historical data, and may be stored in land records 172, legal records 174, media records 176, and/or another storage repository (not shown).

Land records 172 may contain deeds, court orders, administrative proceedings, and/or other similar documents that describe or contain information of locations. For example, a county recording office that maintains digital records may be one example of land records 172. Legal records 174 may include court records, administrative proceedings, legislative acts, regulatory proceedings, and other similar materials. Media records 176 may include newspapers, magazines, radio broadcasts, television broadcasts, and other similar documents.

Figure 2:
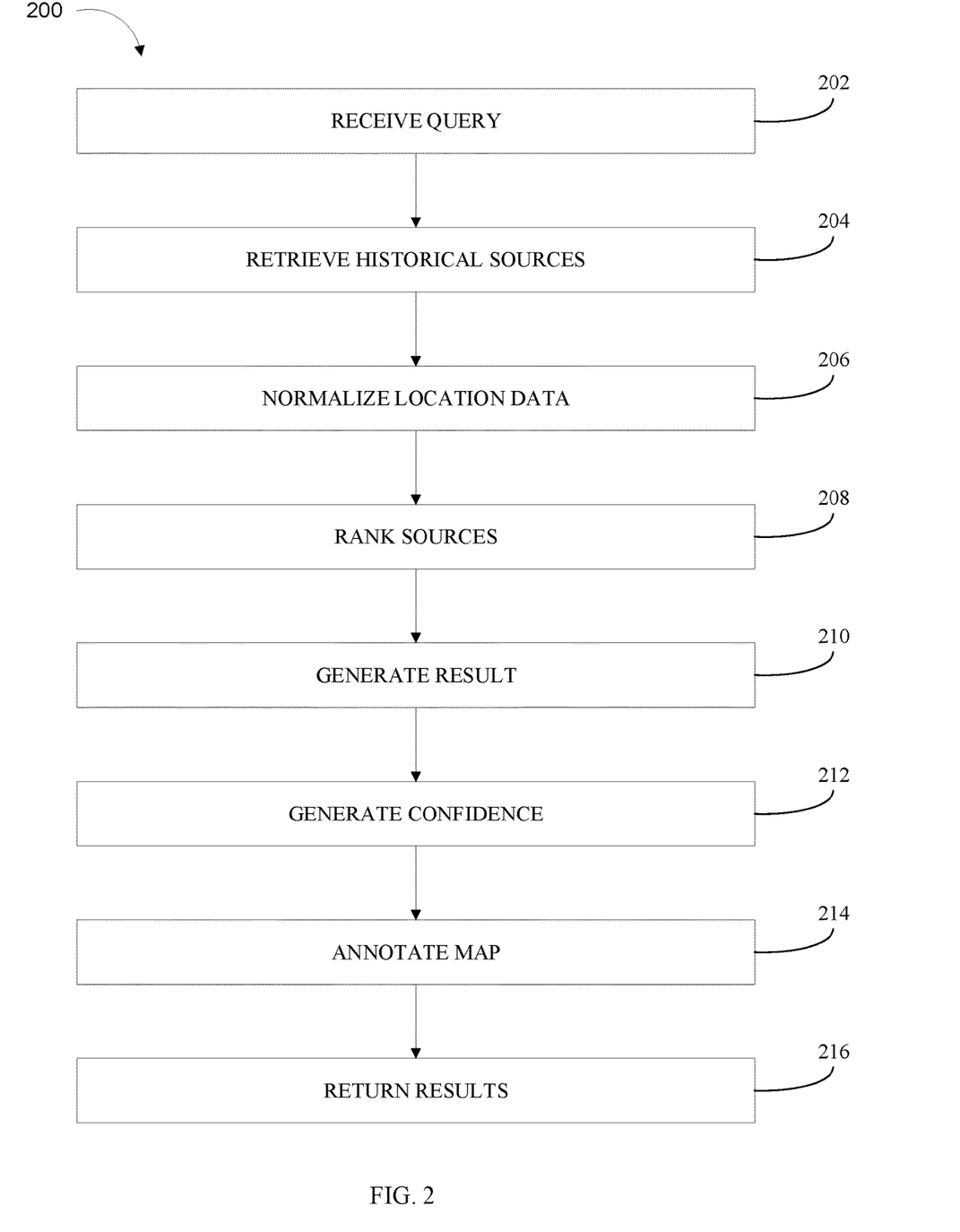
FIG. 2 illustrates a flow chart, generally designated 200, of an example method for providing historical data of mapped areas, in accordance with some embodiments of the present disclosure.

FIG. 2 depicts a flowchart of an example method 200, for displaying historical data about a mapped location that can be performed in a computing environment (e.g., computing environment 100 and/or mapping system 110). One or more of the advantages and improvements described herein can be realized by the method 200.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a computing device (e.g., mapping system 110 of FIG. 1), or a different combination of hardware and/or software. In various embodiments, the various operations of method 200 are performed by one or more of mapping system 110, one of the components within mapping system 110, user device 170, and/or other computing devices (not shown) in computing environment 100.

At operation 202, mapping system 110 receives a query. The query may be received from user device 170 via network 160 and/or from an interface on mapping system 110. In some embodiments, the query includes a request for historical data. The request for historical data may be related to one or more mapped areas.

In some embodiments, the request for historical data is included in the query. For example, a query may be, "what was at this address 10 years ago?". Data analyzer 138 and/or other components determine the query is looking for historical information. NLP and other processes can be used to identify a request for historical data in a query. In some embodiments, the request for historical data is received from user settings. User settings may be linked to a user account and/or stored in profile manager 152. Also, an interface shown to a user on user device 170 may include a checkbox (or other similar indicator) depicting that the user is requesting historical information. In some embodiments, mapping system 110 provides prompts to the user to determine which historical information the user desires. For example, assume a particular mapping interface has a checkbox marked indicating a request for historical information, and the user provides an address with no additional request. The mapping system 110 may generate a question, "what would you like to know about the history of this address?", plus an associated input text box for the user to enter additional details. In some embodiments, the prompt includes suggestions. Continuing with the example, below the input box, common questions could be presented such as, "when was this structure built?"

In some embodiments, operation 202 includes identifying (or locating) the target of the query. For example, if the query asks, "what was in this building in 1995?", then mapping system may obtain an address for the building, a current occupant, and/or other similar data. The identified location and other data may then be used as a reference for other components of mapping system 110 in the various operation of method 200 (e.g., coordinate normalizer 124 has a point by which to reference all other locations, or retrieval module can use the address to query for business licenses at that location, etc.).

At operation 204, mapping system 110 retrieves historical sources. A historical may be a reference that includes historical data about the target of the query. In some embodiments, the sources are retrieved from one or more data repositories. The data repositories may include land records 172, legal records 174, media records 176, and other data sources. In some embodiments, the references are retrieved by retrieval module 134 and/or historic data analyzer 130.

In some embodiments, operation 204 includes prefiltering the results. Prefiltering includes identifying the references that include relevant historical information. Prefiltering the results may limit the time and resources needed to determine a result by limiting the number of documents that need to be normalized, ranked, etc. In some embodiments, retrieving historical sources includes identifying the references that include relevant historical data. In some embodiments, any document with historical data is relevant. In some embodiments, documents with historical data that is related to the query are relevant. For example, if the query includes asking the location of an old school, news stories about the school's athletics may not be relevant, even though they include historical data about the location. In some embodiments, a predefined number of sources are considered relevant. The predefined may be a minimum number or a maximum (e.g., maximum of 5 documents are forwarded to operation 206).

In some embodiments, prefiltering includes identifying a set of references from the plurality of references, wherein the set of references include historical data related to the location. In some embodiments prefiltering includes removing, from the plurality of references, each reference not included in the set of references.

In some embodiments, the sources are retrieved by querying one or more of the repositories. The queries sent to the repositories may be the same as the query received in operation 202. In some embodiments, retrieval module 134 creates separate queries for each repository. For example, a query may ask, "what was located in this building in 2009?", and business licenses and property records will be searched. The query sent to search the repositories can be changed to search for records that contain the address and dates around the relevant time (e.g., 2007 to 2011).

In some embodiments, all available repositories are queried. In some embodiments, a subset of available repositories are queried. Retrieval module 134 may determine which repositories to query based on the query received in operation 202. For example, if a query asks who owned land at a certain time, only recording offices may be searched. That may provide all the information requested at a high confidence. In some embodiments, repositories are searched in a specific order for each query. Then once an adequate number of results are returned, queries stop. For example, recording offices are first searched, then legal records, and then media records for a given location. Applying this to the above example, if there are no hits at the relevant recording office, the system can look for court cases to determine who owned the land, and then for news stories until an adequate number of sources are found.

At operation 206, mapping system 110 normalizes location data. In some embodiments, the location data is normalized by coordinate normalizer 124. In some embodiments, the ECEF coordinate system is used.

At operation 208, mapping system 110 ranks retrieved sources. In some embodiments, the sources are ranked by ranking module 136. In some embodiments, the rankings are based on previous results. For example, if queries asking for who owned property at a time generally get positive or sufficient results from sources from land records 172, land records will generally be ranked high for this type of query.

In some embodiments, each source is given a rank score. For example, documents that generally have better accuracy (e.g., land deeds) will be given a high score, while documents that generally have less accuracy (e.g., photograph and description for a private blog) will have a low score. The score can be, for example, between 0 and 1, and effectively work as a weighting scale. Applying this to the above example, a deed may have a score of 0.9 while the blog may have a score 0.45. The deed would have twice the effect as the blog.

In some embodiments, the sources are ranked from best to worst (e.g., 1 to 5). In these embodiments, the lower the ranking the higher weight it is given, but that weight is not necessarily quantified.

At operation 210, mapping system 110 generates a result to the query. In some embodiments, the result is generated by resolving conflicting sources. Multiple sources may have varying data about a certain location. The ranking of sources may be used to deconflict the sources (or pick which source is more likely correct).

In some embodiments, the result is generated by piecing together various pieces of information. For example, assume a query asks, "where did the circus perform in my town 30 years ago?" This will be relatively more difficult to identify because there are likely no deeds or business records related to the circus. There could be several newspaper stories about the circus over the years. A first article from 1995 may say, "the circus has performed in the same location every year for the last 10 years." Another article from 1997 may say, "the circus is setting up in a new location because the factory is being built at the old circus site." From these fragments of information, it can be determined the circus was at the site of the factory from 1985 to 1995.

At operation 212, mapping system 110 generates a confidence score. In some embodiments, the confidence score is generated by confidence generator 132. In some embodiments, the confidence score is based on operations 208 and/or 210. In some embodiments, the confidence score is correlated to the number and type of sources retrieved. A higher number of references that have similar conclusions may lead to a relatively high confidence score, where the same number of references with conflicting information will generate a lower confidence score. A single reference with a high ranking may lead to a high confidence score. Continuing with the circus example, there is a gap year, 1996, that is not accounted for in the sources. This may lead to a lower confidence score because the circus could have been at a different location in 1995 and 1996. Conversely, if there was no gap, a higher confidence would result.

At operation 214, mapping system 110 annotates the map. In some embodiments, the map is annotated by annotator 122. Annotating may include indicating to the user the historical information requested.

In some embodiments, annotating the map includes generating the map. This may include compiling the data in a format to return to the requestor. In some embodiments, the map is generated by mapping module 120.

At operation 216, mapping system 110 returns the results. The results are returned to the source of the original query (e.g., user device 170). In some embodiments, the results include the annotated map. In some embodiments, the data prepared in operation 214 is returned to the source of the query, and the map is rendered by that system.

In some embodiments, returning the results includes a request for feedback from the user. The feedback may ask for an indication the data provided is what was requested in the query. For example, the feedback may be a question with a yes or no checkbox that asks, "are these the results you were looking for?", or some similar phrase.

In some embodiments, operation 216 includes storing at least a portion of the data related to the query. This data can be stored in a storage medium within or coupled to mapping system 110. The data may then be used to update one or more of neural networks for subsequent queries. In some embodiments, the user feedback is used to update one or more of the neural networks.

Figure 3:
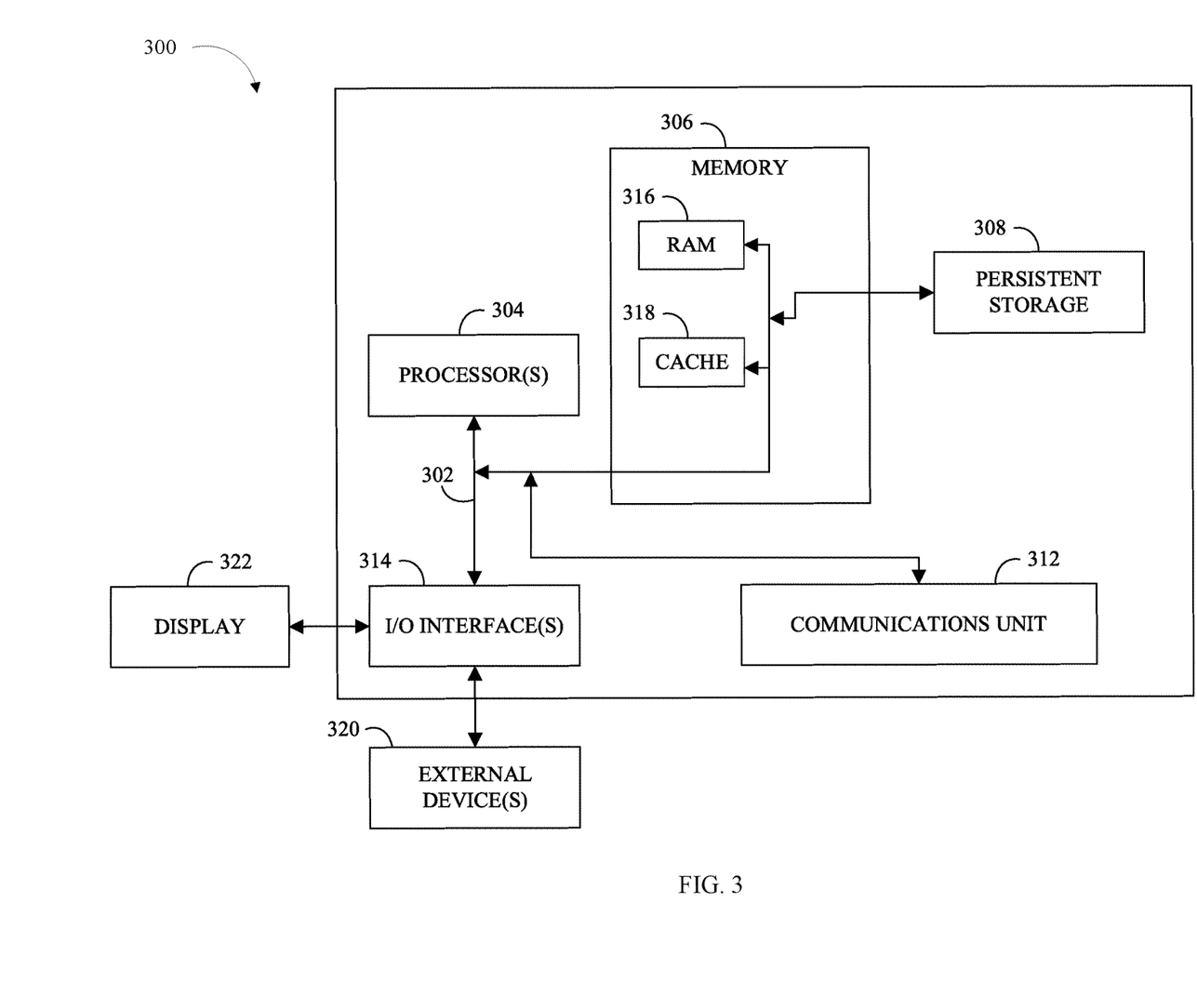
FIG. 3 illustrates a block diagram, generally designated 300, of an example computer system capable of operating a mapping system, in accordance with some embodiments of the present disclosure.

FIG. 3 is a block diagram depicting components of a computer 300 suitable for operation mapping system 110 in accordance with at least one embodiment of the present disclosure. In an embodiment, computer 300 is representative of mapping system 110. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for mapping system 110 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

Figure 4:
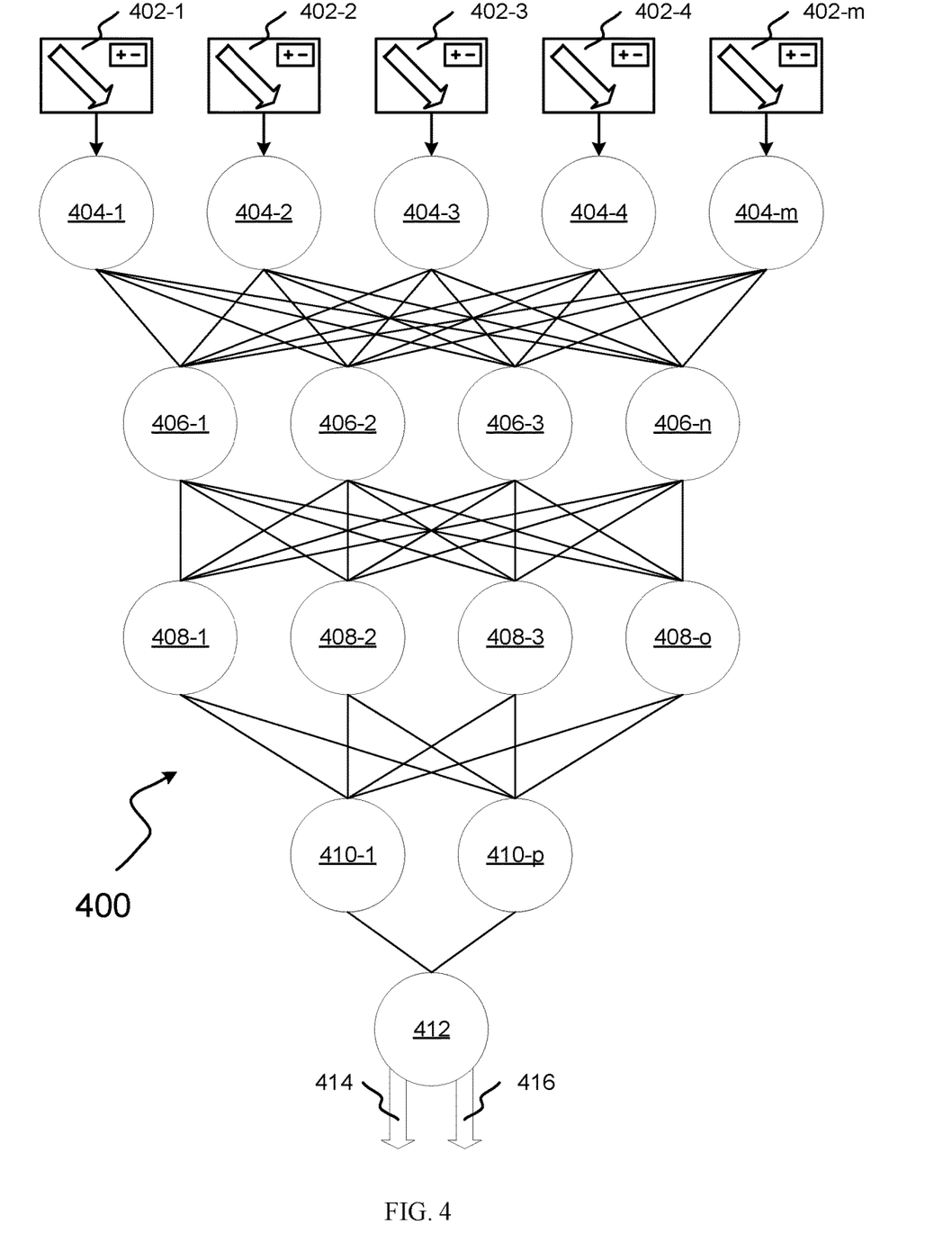
FIG. 4 depicts an example neural network, generally designated 400, that can be specialized to analyze historic data, in accordance with embodiments of the present disclosure.

FIG. 4 depicts an example neural network 400 that can be specialized to train one or more models that can be used to identify and determine historical information about a mapped location. For example, neural network 400 can be specialized to perform operations 204-212 of FIG. 2.

Neural network 400 can be a classifier-type neural network, or convolutional neural network. Neural network 400 can be part of a larger neural network. For example, neural network 400 can be nested within a single, larger neural network, connected to several other neural networks, or connected to several other neural networks as part of an overall aggregate neural network.

Inputs 402-1 through 402-m represent the inputs to neural network 400. In this embodiment, inputs 402-1 through 402-m do not necessarily represent different inputs. Rather, inputs 402-1 through 402-m represent the same input that is sent to each first-layer neuron (neurons 404-1 through 404-m) in neural network 400. In some embodiments, the number of inputs 402-1 through 402-m (i.e., the number represented by m) can equal (and thus be determined by) the number of first-layer neurons in the network. In other embodiments, neural network 400 can incorporate 1 or more bias neurons in the first layer, in which case the number of inputs 402-1 through 402-m can equal the number of first-layer neurons in the network minus the number of first-layer bias neurons.

In some embodiments, a single input (e.g., input 402-1) can be input into the neural network. In such an embodiment, the first layer of neural network 400 can comprise a single neuron 402, which can propagate the input to the second layer of neurons. In some embodiments, the inputs 402-1 through 402-m are each a plurality of training documents configured to train the components of mapping system 110 how to determine which references to retrieve, rank sources, resolve data overlaps and discrepancies, piece together fragments of data to generate a result, and/or generate confidence scores.

Inputs 402-1 through 402-m can comprise one or more values correlating to ranking data sources. Neural network 400 comprises 5 layers of neurons (referred to as layers 404, 406, 408, 410, and 412, respectively corresponding to illustrated nodes 404-1 to 404-m, nodes 406-1 to 406-n, nodes 408-1 to 408-o, nodes 410-1 to 410-p, and node 412). In some embodiments, neural network 400 can have more than 5 layers or fewer than 5 layers. Each layer can comprise the same number of neurons as any other layer, more neurons than any other layer, fewer neurons than any other layer, or more neurons than some layers and fewer neurons than other layers.

In the embodiment illustrated in FIG. 4, layer 412 is treated as the output layer. Layer 412 can output a rank (e.g., likelihood a particular source has accurate information). For example, layer 412 can output the probability that a source is accurate and related to the query. In the embodiment illustrated in FIG. 4, no bias neurons are shown in neural network 400. However, in some embodiments, each layer in neural network 400 can contain one or more bias neurons. Although layer 412 is shown having one output neuron (node 412), in other embodiments, layer 412 contains more than one output neuron.

Layers 404-412 can each comprise an activation function. The activation function utilized can be, for example, a rectified linear unit (ReLU) function, a SoftPlus function, a Soft step function, or others. Each layer can use the same activation function but can also transform the input or output of the layer independently of, or dependent upon, the ReLU function. This is also true in embodiments with more or fewer layers than are illustrated here.

Layer 412 is the output layer. In this embodiment, neuron 412 produces outputs 414 and 416. Outputs 414 and 416 represent complementary probabilities that a target event will or will not occur. In some embodiments, outputs 414 and 416 represent the overall confidence score, and/or type confidence scores. In some embodiments, there is an output node for each type confidence score (e.g., each module in historic data analyzer 130). In some embodiments, there is an output node for the overall confidence score. In some embodiments, outputs 414 and 416 can each be between 0.0 and 1.0 and can add up to 1.0. In such embodiments, a probability of 1.0 can represent a projected absolute certainty (e.g., if output 414 were 1.0, the projected chance that the target event would occur would be 100%, whereas if output 416 were 0.0, the projected chance that the target event would not occur would be 100%).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
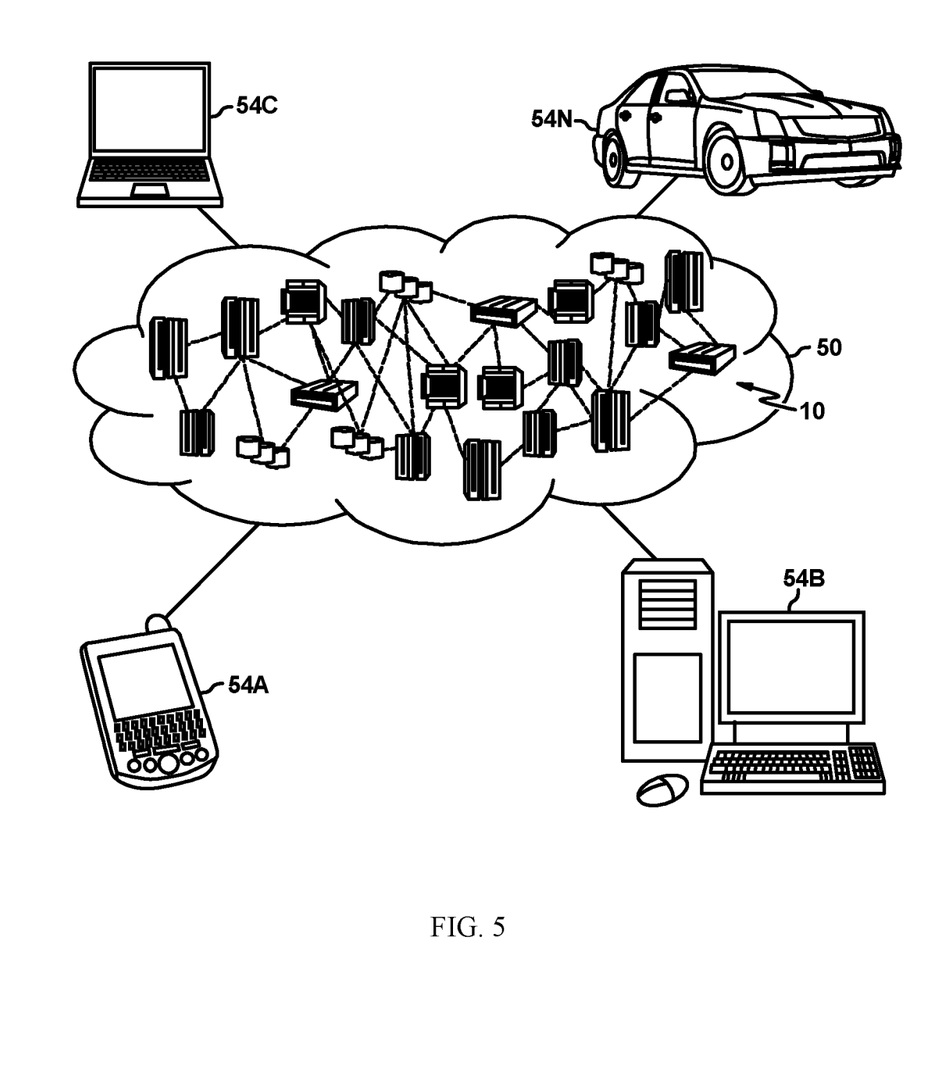
FIG. 5 depicts a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
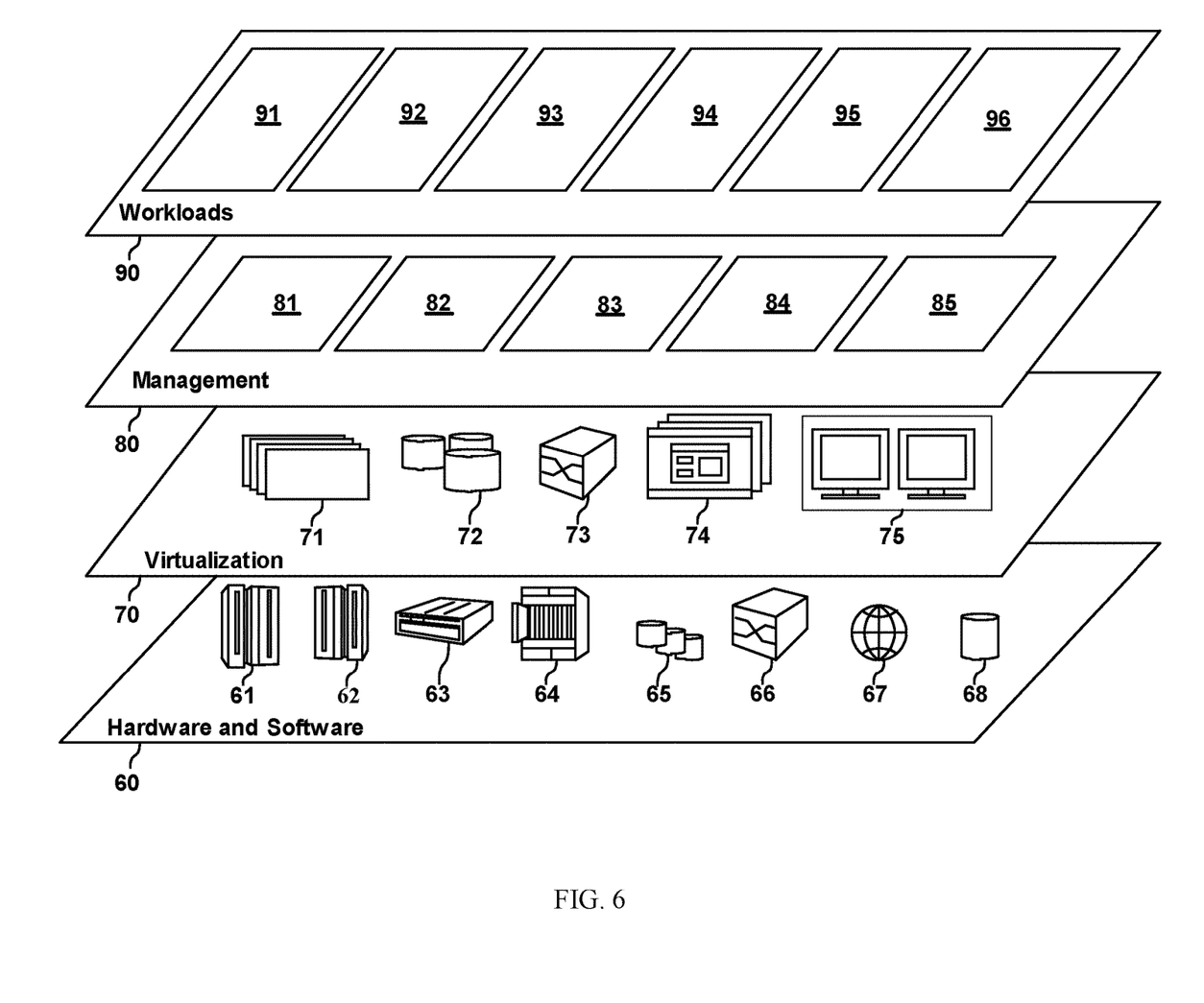
FIG. 6 depicts abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and historic data analysis 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the
block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a mapping system, a first query, wherein the first query includes a request for historical information about a location, based on historical data of the location in a mapped area;
   retrieving, in response to the first query, a plurality of references from a plurality of data repositories, wherein each reference includes a location reference that describes a piece of information about the location, and each reference is related to the location in the mapped area;

normalizing each location reference from each of the plurality of references to a common coordinate system;

ranking, by the mapping system, each reference of the plurality of references;

generating, by the mapping system, a first result, wherein the first result includes the historical information about the location, the first result is responsive to the first query, and the first result is based on the ranking; and displaying the first result.

2. The computer-implemented method of claim 1, further comprising:

generating a map, wherein the map includes the mapped area;

annotating, by the mapping system, the map with the historical information included with the first result; and displaying the map to a user.

3. The computer-implemented method of claim 2, wherein the annotating includes superimposing the first result on the map.

4. The computer-implemented method of claim 2, further comprising:

determining a confidence score for the first result, wherein:

the confidence score represents a likelihood the historical information about the location is accurate; and annotating the map includes displaying the confidence score for the first result.

5. The computer-implemented method of claim 4, wherein displaying the first result to the user is in response to the confidence score being above a predetermined threshold.

6. The computer-implemented method of claim 1, further comprising:

comparing each normalized location reference against all other normalized location references of the plurality of references;

determining a first location reference from a first reference is different from a second location reference from a second reference; and determining, based on the ranking, the first reference is ranked higher than the second reference, wherein:

the result corresponds to the first location reference.

7. The computer-implemented method of claim 1, wherein the first result is generated by a learning model.

8. The computer-implemented method of claim 7, further comprising:

storing the result; and updating, based on the result, the learning model.

9. The computer-implemented method of claim 1, wherein each of the plurality of references are analyzed using natural language processing.

10. The computer-implemented method of claim 1, wherein the common coordinate system is an Earth-Centered Earth-Fixed coordinate system.

11. The computer-implemented method of claim 1, further comprising:

identifying a set of references from the plurality of references, wherein the set of references include historical data related to the location; and removing, from the plurality of references, each reference not included in the set of references.

12. The method of claim 1, wherein the request for historical information includes a request for a previous location of a torn down building, and the overlay includes an outline of the old building relative to a replacement building for the old building.

13. A system comprising:

a processor; and a computer-readable storage medium communicatively coupled to the processor and storing program instructions which, when executed by the processor, are configured to cause the processor to:

receive, by a mapping system, a first query from a user, wherein the first query includes a request for historical information about a location, based on historical data of the location in a mapped area;

retrieve, in response to the first query, a plurality of references from a plurality of data repositories, wherein each reference includes a location reference that describes a piece of information about the location, and each reference is related to the location in the mapped area;

normalize each location reference from the plurality of references to a common coordinate system;

rank, by the mapping system, each reference of the plurality of references;

generate, by the mapping system, a first result, wherein the first result includes the historical information about the location, the first result is responsive to the first query, and the first result is based on the ranking; and determine a confidence score for the first result; and return the first result to the user.

14. The system of claim 13, wherein the program instructions are further configured to cause the processor to:

generate a map, wherein the map includes the mapped area;

annotate, by the mapping system, the map with the historical information included with the first result; and display the map to the user.

15. The system of claim 13, wherein the program instructions are further configured to cause the processor to:

compare each normalized location reference against each of the other location references of the plurality of references;

determine a first location reference is different than a second location reference; and determine, based on the rank, the first location reference is ranked higher than the second location reference, wherein:

the result corresponds to the first location reference.

16. A computer program product, the computer program product comprising a computer readable storage medium having program instructions embodied therewith, the program instructions executable by a processing unit to cause the processing unit to:

receive, by a mapping system, a first query from a user, wherein the first query includes a request for historical information about a location, based on historical data of the location in a mapped area;

retrieve, in response to the first query, a plurality of references from a plurality of data repositories, wherein each reference includes a location reference that describes a piece of information about the location, and each reference is related to the location in the mapped area;

normalize each location reference from the plurality of references to a common coordinate system;

rank, by the mapping system, each reference of the plurality of references;

generate, by the mapping system, a first result, wherein the first result includes the historical information about the location, the first result is responsive to the first query, and the first result is based on the ranking; and determine a confidence score for the first result; and return the first result to the user.

17. The computer program product of claim 16, wherein the program instructions are further configured to cause the processing unit to:

generate a map, wherein the map includes the mapped area;

annotate, by the mapping system, the map with the historical information included with the first result; and display the map to the user.

18. The computer program product of claim 17, wherein the annotating includes superimposing the first result on the map.

19. The computer program product of claim 18, wherein annotating the map includes displaying the confidence score for the first result and the confidence score represents a likelihood the historical information about the location is accurate.

20. The computer program product of claim 19, wherein the program instructions are further configured to cause the processing unit to:

compare each normalized location reference against all of the other location references of the plurality of references;

determine a first location reference is different than a second location reference; and determine, based on the ranking, the first location reference is ranked higher than the second location reference, wherein:

the result corresponds to the first location reference.

* * * * *